US007390850B2

(12) United States Patent
Cook et al.

(10) Patent No.: US 7,390,850 B2
(45) Date of Patent: Jun. 24, 2008

(54) THERMOPLASTIC ELASTOMER COMPOSITIONS

(75) Inventors: Stuart Cook, Brickendonbury (GB); Andrew Tinker, Brickendonbury (GB); Jaymini Patel, Brickendonbury (GB)

(73) Assignee: Tun Abdul Razak Research Centre (GB)

( * ) Notice: Subject to any disclaimer, the term of this patent is extended or adjusted under 35 U.S.C. 154(b) by 138 days.

(21) Appl. No.: 10/498,269

(22) PCT Filed: Dec. 9, 2002

(86) PCT No.: PCT/GB02/05559

§ 371 (c)(1),
(2), (4) Date: Dec. 14, 2004

(87) PCT Pub. No.: WO03/054078

PCT Pub. Date: Jul. 3, 2003

(65) Prior Publication Data

US 2006/0036038 A1     Feb. 16, 2006

(30) Foreign Application Priority Data

Dec. 8, 2001   (GB) ................................. 0129474.3

(51) Int. Cl.
*C08L 23/00* (2006.01)
(52) U.S. Cl. ................... 525/191; 525/192; 525/194; 525/240; 525/241; 525/242; 525/232; 525/236
(58) Field of Classification Search ................. 525/191, 525/192, 194, 240, 241, 242, 232, 236
See application file for complete search history.

(56) References Cited

U.S. PATENT DOCUMENTS

| 3,037,954 | A |   | 6/1962  | Gessler et al. |         |
|-----------|---|---|---------|----------------|---------|
| 4,104,210 | A |   | 8/1978  | Coran et al.   |         |
| 4,108,947 | A | * | 8/1978  | Kimura et al.  | 525/97  |
| 4,202,801 | A |   | 5/1980  | Petersen       |         |
| 4,271,049 | A |   | 6/1981  | Coran et al.   |         |
| 4,394,435 | A |   | 7/1983  | Farber et al.  |         |
| 4,960,830 | A | * | 10/1990 | Hazelton et al.| 525/196 |
| 5,171,790 | A | * | 12/1992 | Roland et al.  | 525/236 |
| 5,714,545 | A |   | 2/1998  | Lee et al.     |         |
| 6,184,295 | B1| * | 2/2001  | Okuyama        | 525/192 |

FOREIGN PATENT DOCUMENTS

EP    0 428 153    3/1995
EP    0 699 712    11/1997

OTHER PUBLICATIONS

International Search Report for International Application No. PCT/GB02/05559 dated Mar. 24, 2003.
International Preliminary Examination Report for International Application No. PCT/GB02/05559 dated Jan. 16, 2004.
Chapter 7 by A.Y. Coran in "Thermoplastic Elastomers, a Comprehensive Review", Thermoplastic Elastomers Based on Elastomer-Thermoplastic Blends, N.R. Legge, G. Holden and H.E. Schroeder, eds., Hanser, Munich, 1987, pp. 134-161.
L.D. Loan, "Mechanism of Peroxide Vulcanization of Elastomers" Rubber Chemistry and Technology, 40, pp. 149-176, 1967.
F.W. Billmeyer, Jr., Chapter One, "The Science of Large Molecules", Textbook of Polymer Science 3rd Ed., Wiley-Interscience, New York, 1984, pp. 3-16.
J.W. Martin, "1,2-Polybutadiene Resin Co-Agents for Peroxide Cure of Rubber Compounds", Rubber Chemistry and Technology, 62, pp. 275-285, 1973.
S. Kawahara and S. Akiyama, "Volume Contraction on Mixing in Poly(vinyl ethylene-co-1,4-butadiene)/Polyisoprene Blends", Polymer Journal, vol. 23, No. 1, pp. 7-14, 1991.
S. Cook, "improving the Low Temperature Resistance of Natural Rubber", Journal of Rubber Research, vol. 4, pp. 69-81, 2001.
C.M. Roland, "Rubber Mixtures", Rubber Chemistry and Technology, vol. 62, pp. 456-497, 1989.

* cited by examiner

*Primary Examiner*—Randy Gulakowski
*Assistant Examiner*—Olga Asinovsky
(74) *Attorney, Agent, or Firm*—Cantor Colburn LLP

(57) ABSTRACT

A thermoplastic elastomer composition comprises a blend of a thermoplastic component with a cured elastomer component characterised in that the elastomer component prior to curing comprises a major proportion of a main elastomer and a minor proportion of a high molecular weight reactive polymer which shows a higher crosslinking efficiency in free-radical induced vulcanisation than the main elastomer. Preferably, the high molecular weight reactive polymer comprises from (3) to (15), and more preferably (4) to (10), parts by weight per one hundred parts of the total elastomer component of the composition. The use of the high molecular weight reactive polymer in the composition improves the low temperature performance of the composition and gives improvements to the processing behaviour, the resistance to stiffening at low temperatures and recovery/relaxation properties. Preferably, the high molecular weight reactive polymer is miscible with the main elastomer in the elastomer component. The thermoplastic elastomer composition may be made by mixing the thermoplastic component and an elastomer component comprising a main elastomer and a high molecular weight reactive polymer at a temperature to cause melting of the thermoplastic component to give a melt blend of the components, and subjecting the elastomer component in the melt blend to cure in the presence of at least one curative free-radical source.

40 Claims, 3 Drawing Sheets

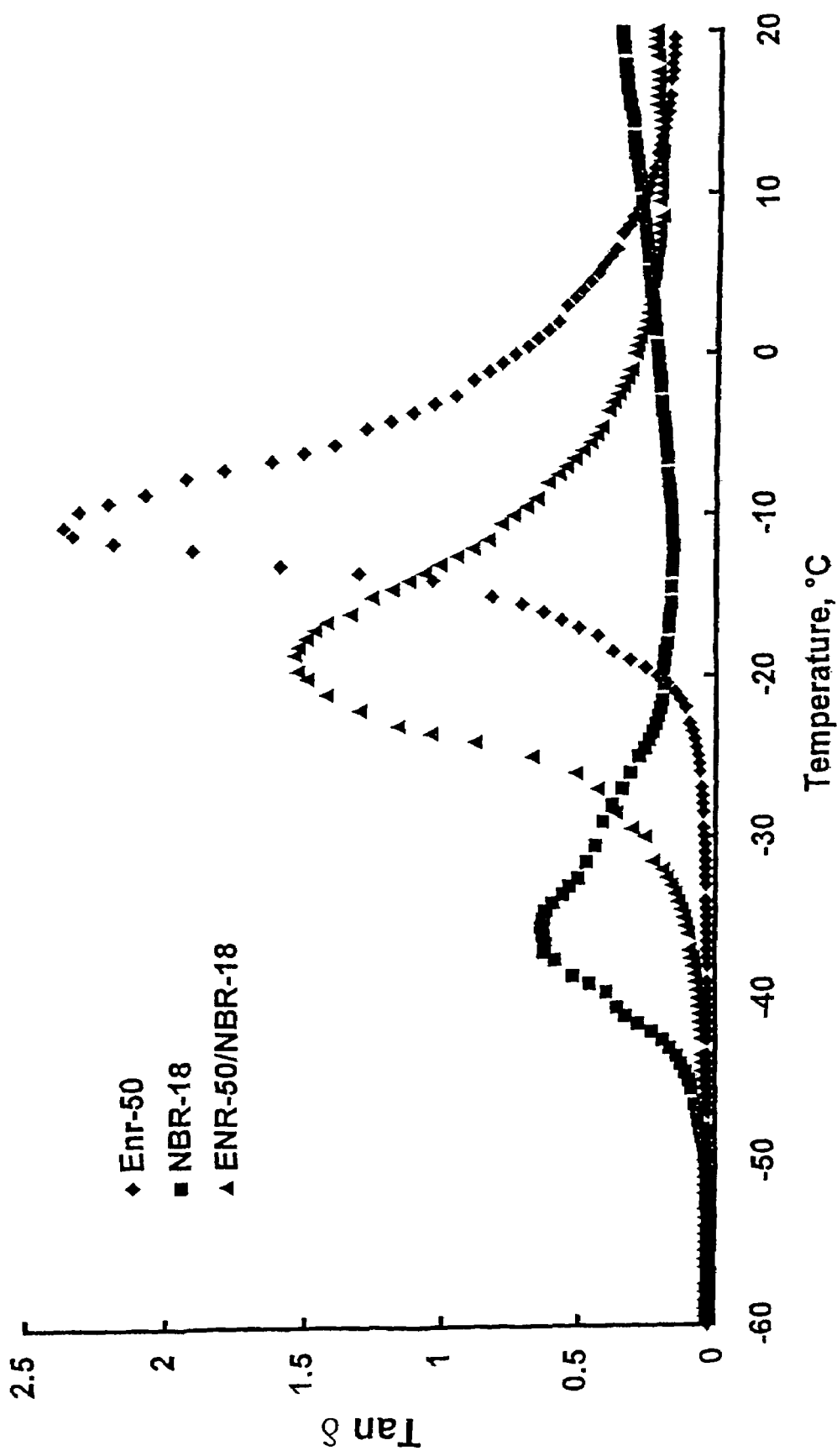

THERMOPLASTIC ELASTOMER COMPOSITIONS

The present invention relates to thermoplastic elastomeric compositions comprising blends of cured elastomers and thermoplastics, such as polyolefins, in which the elastomer is cured using a combination of a free-radical initiator, such as a peroxide, and an additional high molecular weight polymer which participates more effectively in radically induced crosslinking.

Thermoplastic elastomers comprising blends of cured elastomers and thermoplastics are well-established and are described in, for instance, U.S. Pat. No. 3,037,954, U.S. Pat. No. 4,104,210 and U.S. Pat. No. 4,271,049. Such compositions are produced by a process generally known as dynamic vulcanisation in which the elastomer is crosslinked during melt blending with a thermoplastic; such materials are often known as thermoplastic vulcanisates[1]. The crosslinking introduced in the elastomer during dynamic vulcanisation is important in defining the properties obtained from the thermoplastic vulcanisate, particularly the relaxation and recovery properties. Effective crosslinking during dynamic vulcanisation is, therefore, an important consideration. Although many combinations of elastomers and thermoplastics have been considered in the prior art, those which have been commercialised successfully have been based on butyl rubber (IIR)[2], ethylene-propylene-diene rubber (EPDM)[3], natural rubber (NR)[4], nitrile rubber (NBR)[5] or epoxidized natural rubber (ENR)[6] blended with a polyolefin, most often polypropylene. A variety of cure systems has been used for the key process of dynamic vulcanisation—sulphur-based, resin, peroxide (most often with a coagent) and, more recently, hydrosilane[7].

Thermoplastic elastomer blends comprising blends of more than one cured elastomer and thermoplastics are also known, for instance, from U.S. Pat. No. 4,202,801. Here, the main elastomer component of the thermoplastic component, a mono olefin copolymer rubber such as EPDM, contains a significant proportion (10 to 80% by weight of the total composition) of a conjugated diene rubber such as natural rubber.

The use of a coagent to increase the yield of crosslinks obtained from peroxide curatives is commonplace and is widely reported for the purpose of dynamic vulcanisation in order to avoid the need to use excessively high levels of peroxide, as for instance in U.S. Pat. No. 4,104,210. In increasing the yield of crosslinks, the coagent becomes incorporated in or forms crosslinks. Crosslinking with peroxide or other reagents capable of decomposing to give reactive free-radicals is inherently more efficient[8] in some polymers, such as those based on or containing a substantial proportion of butadiene repeat units[9], than others, such as those based on or containing isoprene repeat units or those with low levels of unsaturation. Whilst liquid 1,2-polybutadiene having a low molecular weight (typically <5,000) is known as a coagent[10], the present invention is based on the discovery of a new approach to increasing the effectiveness of dynamic vulcanisation with peroxide or other source of free-radicals thereby imparting improvements in various properties of the cured composition. We have found that these improvements may be achieved by incorporating, into the feedstock for dynamic vulcanisation, an additional high molecular weight polymer which shows a higher efficiency in free-radical induced vulcanisation[8] than the main elastomer.

Accordingly, in a first aspect, the present invention provides a thermoplastic elastomer composition comprising a blend of a thermoplastic component with a cured elastomer component characterised in that the elastomer component prior to curing comprises a major proportion of a main elastomer and a minor proportion of a high molecular weight reactive polymer which shows a higher efficiency in free-radical induced vulcanisation than the main elastomer.

In a second aspect, the present invention provides a method of making a thermoplastic elastomer composition comprising the steps of mixing a thermoplastic component and an elastomer component comprising a main elastomer and a high molecular weight reactive polymer which shows a higher efficiency in free-radical induced vulcanisation than the main elastomer at a temperature to cause melting of the thermoplastic component to give a melt blend of the components and subjecting the elastomer component in the melt blend to cure in the presence of at least one curative free-radical source.

According to a third aspect, the present invention provides a feedstock composition for use in a dynamic vulcanisation process comprising a mixture of a thermoplastic component and an elastomer component, the elastomer component comprising a major proportion of a main elastomer and a minor proportion of a high molecular weight reactive polymer which shows a higher efficiency in free-radical induced vulcanisation than the main elastomer.

Advantages that may be achieved by the use of the high molecular weight reactive polymers, according to the invention, include improved low temperature performance, improved processing behaviour, improved resistance to stiffening at low temperatures and improved recovery/relaxation properties.

The thermoplastic elastomer composition comprises a thermoplastic component. Typically, this may be a polyolefin resin although other thermoplastic polymers, such as polyamides, may also be used in the invention. Suitable thermoplastic polyolefin resins are well-known in the art and include products obtained by the polymerisation of one or more 2 to 8C alkenes. Preferably, the polyolefin resin will be polyethylene or polypropylene, with polypropylene being more preferred.

The elastomer component which is subjected to curing during the dynamic vulcanisation procedure comprises a major proportion of a main elastomer and a minor proportion of a high molecular weight reactive polymer which shows a higher efficiency in free-radical induced vulcanisation than the main elastomer.

The main elastomer in the elastomer component is an essentially non-crystalline, rubbery homopolymer of a diolefin or a copolymer in which one component of the polymer chain is derived from a diolefin. Examples, which are non-limiting, include cis-1,4-polyisoprene (both synthetic and natural, as in the case of natural rubber), epoxidized cis-1,4-polyisoprene and ethylene-propylene-diene rubber.

The minor proportion of the elastomer component is formed by a high molecular weight reactive polymer which shows a higher efficiency in free-radical induced vulcanisation than the main elastomer. By the term "high molecular weight" as used herein, we mean polymers having a weight average molecular weight of at least 100,000 and typically having a number average molecular weight of at least 40,000. By comparison, liquid 1,2-polybutadienes, as used in the prior art as coagents, typically have weight average molecular weights of less than 5000 and number average molecular weights of less than 2000. Such weight average (Mw) and number average (Mn) molecular weights are determined using the technique of Gel Permeation Chromatography (GPC), also known as Size Exclusion Chromatography, which is a well recognised analytical technique for determining molecular weights of polymeric materials. It will, thus, be recognised that the high molecular weight reactive polymer used in the present invention will typically have a molecular weight approximately equivalent to that of the main elastomer used in the elastomer component of the invention. Examples of high molecular weight reactive polymers that can be used in the present invention include, but are not limited to, polybutadienes (BR) which may contain low or high contents of 1,2-polybutadiene, 1,2-polybutadiene itself, acrylonitrile rubber (NBR) and styrene-butadiene rubber (SBR). Specific examples of commercially-available high molecular weight reactive polymers include Buna Vi70 (Bayer AG) which is an atactic high-vinyl butadiene rubber, syndiotactic 1,2-polybutadiene RB 810, RB 820 and RB 830 (Japan Synthetic Rubber) and nitrile rubber with acrylonitrile contents of 18 and 21% (Perbunan 1807 and Nipol 1094-80, respectively).

In the most preferred embodiment, the high molecular weight reactive polymer is miscible with the main elastomer in the composition. Examples of miscibility to give a single elastomer phase in the composition are cis-1,4-polyisoprene, including natural rubber, with 1,2-polybutadiene or polybutadiene with a substantial 1,2-content (typically at least 30%) and epoxidized cis-1,4-polyisoprene, including epoxidized natural rubber, with acrylonitrile-butadiene rubber (nitrile rubber). It is known that polybutadiene with a 1,2-content of 32.3% is miscible with cis-1,4-polyisoprene[11]. The miscibility of polybutadiene having a 1,2-content of at least 65% and natural rubber, or synthetic cis-1,4-polyisoprene, is well-established[12] but unusual for such high molecular weight polymers[13]. In such instances, the high molecular weight reactive polymer acting to increase the overall efficiency of crosslinking may be considered as not acting as a coagent in the conventional sense; the miscible blend is vulcanised as a whole, but at a higher efficiency. The miscibility of the polymers has been found to confer additional benefits on the composition, improved low temperature performance for instance.

In other compositions, the high molecular weight reactive polymer is immiscible with the main elastomer and is evident as a separate phase within the elastomer component of the dynamically vulcanised blend. An example is polybutadiene having a high 1,2-content blended with ethylene-propylene-diene rubber, in which the high molecular weight reactive polymer can be readily identified by electron microscopy as a separate phase within the ethylene-propylene-diene rubber, with a size typically of the order of 100 nm or less. The results we have obtained using a high molecular weight reactive polymer which is immiscible with the main elastomer are surprisingly good in view of expectations based on the prior art.

Whether the high molecular weight reactive polymer is miscible with the main elastomer or not, it can be used as part replacement of the main elastomer in the composition.

The benefits of using a combination of free-radical source, such as peroxide, and a high molecular weight reactive polymer, rather than a conventional coagent, are ease of use—the high molecular weight reactive polymer may be added with the other polymers as granules or pellets—and lower cost, polymers such as polybutadiene and nitrile rubber cost, typically, £1.20-1.50/kg compared with, typically, £2.00-20.00/kg for conventional coagents.

The benefits of using polybutadiene having a high 1,2-content as the high molecular weight reactive polymer in the preparation of compositions based on natural rubber are ease of use, attaining a softer material at similar composition and crosslink density, improved processing behaviour and improved resistance to stiffening at low temperatures. Such a high molecular weight reactive polymer may be either atactic, as in the Buna Vi (Bayer AG) polymer used in some of the examples or syndiotactic such as the RB 810 (Japan Synthetic Rubber) used in other examples. The syndiotactic form is partially crystalline, but both this and the atactic form are effective in this invention.

The benefits in using nitrile rubber (NBR) as the high molecular weight reactive polymer in the preparation of compositions based on epoxidized natural rubber are ease of use, improved processing behaviour, improved recovery/relaxation properties and reduced brittle temperature. Selection of NBR with the appropriate acrylonitrile content to permit miscibility with the ENR is critical if the full benefits are to be obtained, particularly reduced brittle temperature, which arises from the lower glass transition temperature of the miscible blend than that of the ENR alone.

The benefits in using high molecular weight reactive polymers in the preparation of compositions based on main elastomers with which they are not miscible, such as ethylene-propylene-diene rubber or epoxidized with 1,2-polybutadiene, are ease of use, improved processing behaviour and improved properties, particularly recovery/relaxation.

The composition comprising the thermoplastic component and the elastomer component will typically be formulated, prior to dynamic vulcanisation, to contain from 15 to 75 parts by weight of the thermoplastic component and from 85 to 25 parts by weight of the elastomer component per one hundred parts by weight of the total of the thermoplastic component and the elastomer component. The elastomer component typically comprises from 98 to 80 parts by weight of the main elastomer and from 2 to 20 parts by weight of the high molecular weight reactive polymer per one hundred parts of total elastomer. Preferably, the high molecular weight reactive polymer comprises from 3 to 15 and more preferably 4 to 10 parts by weight per one hundred parts of total elastomer.

Dynamic vulcanisation is carried out by a process comprising the steps of mixing the thermoplastic component and an elastomer component comprising the main elastomer and the high molecular weight reactive polymer at a temperature at which the thermoplastic component melts under mixing to form a melt blend of the components and then subjecting the elastomer component in the melt blend to cure in the presence of at least one free-radical initiator, preferably a peroxide, such as bis(tert-butylperoxyisopropyl)benzene (DIPP).

The compositions may be melt blended by batch mixing in an internal mixer, continuous mixing in a twin screw extruder (TSE) or a combination of the two when a 2-stage process is used. The procedures used are familiar to those well-versed in the art and are not limited to those given specifically in the examples below. In general, the main elastomer, the high molecular weight reactive polymer and the thermoplastic resin are mixed to melt the thermoplastic and mixing is continued, typically, for about 10 seconds to 5 minutes, depending on the shear rate prevailing during mixing, in order to allow melt blending. The material can be removed from the mixer at this stage and rendered into pellets, prior to remixing with the free-radical source, for dynamic vulcanisation or the free-radical source can be added to the melt blend. It is also possible to include the free-radical source at the beginning of the mixing process. Melt blending during crosslinking is conducted for an appropriate time to ensure that the dynamic vulcanisation process is complete, typically for about 10 seconds to 5 minutes depending on the free-radical source used and the shear rate and temperature prevailing during mixing. If desired, one or more plasticisers may be added at this stage. Ingredients which are conventional in the compounding of thermoplastic vulcanisates may be incorporated in the blend before or after dynamic vulcanisation. Examples of such ingredients include, but are not limited to, pigments, dyes, fillers, stabilizers, antioxidants, plasticers and process aids. The identities and the proportions used of such ingredients are well known in the art and need not be discussed further here.

BRIEF DESCRIPTION OF THE DRAWINGS

Refer now to the figures, which are exemplary and not limiting.

FIG. 3 is a graphical representation of the dependence of Tan δ on temperature for epoxidized natural rubber, nitrile rubber, and a blend thereof.

EXPERIMENTAL

Ingredients used in the Experimental work were a viscosity-stabilised grade of natural rubber from Standard Malaysian Rubber (SMR CV), 50 mole % epoxidized natural rubber (Epoxyprene 50), ethylene-propylene-diene rubber (Polysar 5875 and Buna EP T 4969), high-vinyl butadiene rubber (Buna Vi70), syndiotactic 1,2-polybutadiene (JSR RB 810), nitrile rubber with acrylonitrile contents of 18 and 21% (Perbunan 1807 and Nipol 1094-80), styrene-butadiene rubber with a styrene content of 23.5% (Intol 1502), homopolymer grade polypropylene with a melt flow index of 3 g/10 min (Mosten 58412), carboxylated polypropylene (PB3150) bis (tert-butylperoxyisopropyl)benzene (DIPP), 2,5-bis(tert-butylperoxy)-2,5-dimethylhexane (DHBP), 2,5-bis(tert-butylperoxy)-2,5-dimethyl-3-hexyne (DYBP), liquid 1,2-polybutadiene (Lithene AH), m-phenylene bismaleimide (HVA-2), naphthenic oil with low viscosity (Strukthene 380), paraffinic oil with medium viscosity (Strukpar 2280), C9-11 alkyl phthalate (911P) and Irganox 1010, Flectol H and Arbastab Z antioxidants. In the Examples, all amounts are parts by weight per hundred parts by weight of total polymer (pphp) unless stated otherwise.

Molecular Weight Determination

These data were obtained using the technique of Gel Permeation Chromatography (GPC), otherwise known as Size Exclusion Chromatography, which is a well recognised analytical technique for determining molecular weights of polymeric materials. The calculation of molecular weights from experimentally determined data relies on the use of parameters (K and α values) which are dependent upon the polymer type and solvent used to dissolve the polymer. For a given solvent, these parameters do not vary much between polymers which are similar in composition and for all of the 1,2-polybutadienes samples analysed here, the same values of K and a have been used.

Values of the number average molecular weight (Mn) and the weight average molecular weight (Mw) are given in Table 1, both types of molecular weight are often referred to. The values obtained are in good agreement with values indicated in the trade literature from Synthomer Ltd. who produce the liquid 1,2-polybutadiene and from JSR who produce RB810.

TABLE 1

Molecular weights of 1,2-polybutadienes

| | | Commercially quoted molecular weight | | Molecular weight determined by GPC | |
|---|---|---|---|---|---|
| | Material | Mn | Mw | Mn | Mw |
| 'High' molecular weight 1,2-polybutadiene | Buna Vi 70 HM (Bayer) | — | — | 174800 | 313900 |
| | RB 810 (JSR) | | 120000 | 57400 | 120800 |
| | RB 820 (JSR) | | 120000 | 65300 | 127600 |
| 'Low' molecular weight 1,2-polybutadiene | Lithene AH (Synthomer Ltd) | 1800 | | 1940 | 3410 |

Examples 1 (Comparative) and 2

Figure 1:
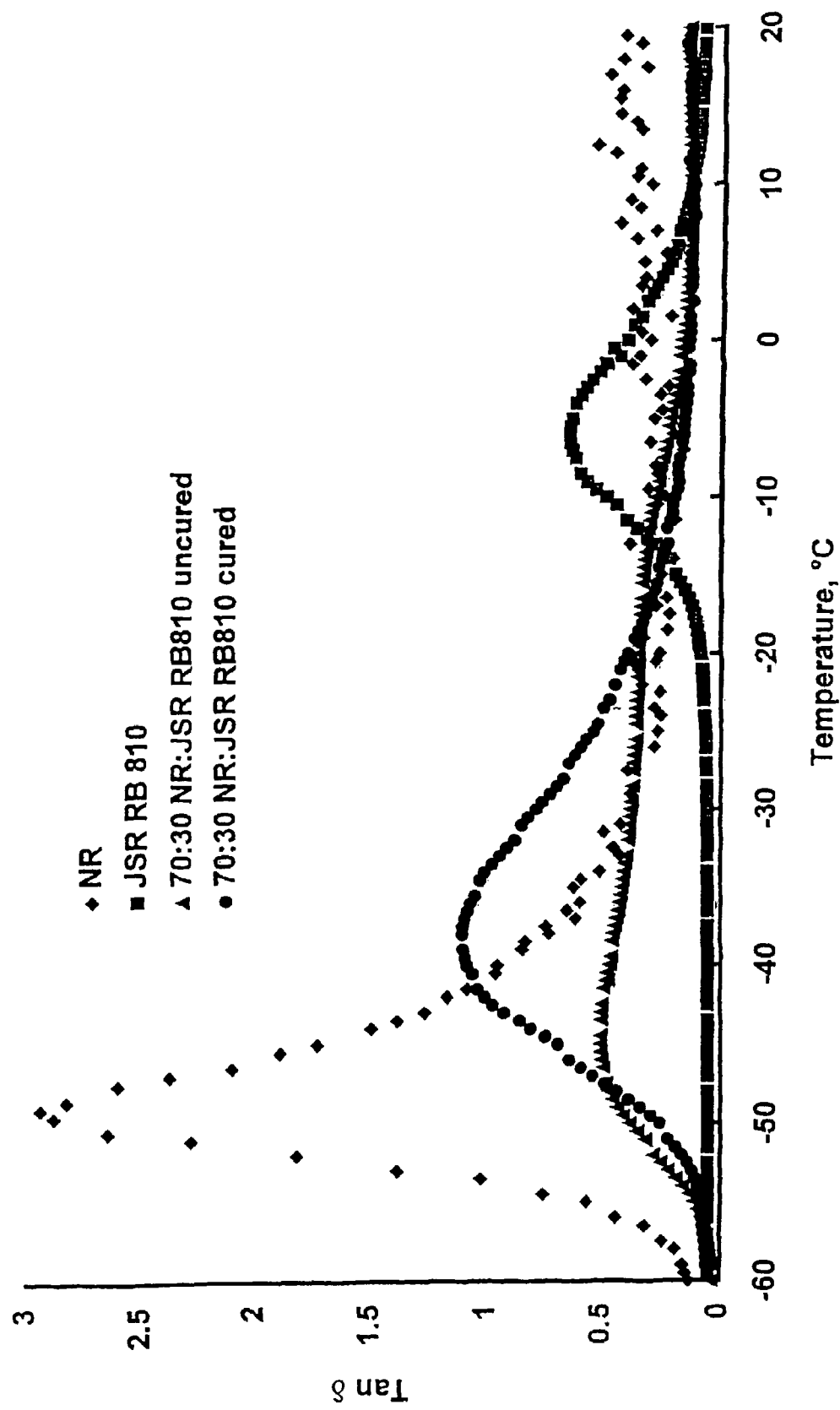
FIG. 1 is a graphical representation of the dependence of Tan δ on temperature for natural rubber (NR)/high vinyl polybutadiene (BR) blends.

The miscibility of cis-1,4-polyisoprene, such as NR, with high molecular weight polybutadiene containing 1,2-polybutadiene is well-established[12], and it is recorded that such miscibility extends to 1,2-contents as low as 30%[11]. A commonly used technique for indicating miscibility in polymer blends is Differential Mechanical Thermal Analysis (DMTA). This technique identifies, for a miscible blend, a single tan δ maximum indicating a single glass transition temperature positioned between the glass transition temperatures for the component polymers in the blend and dependent upon the composition of the blend. For an immiscible blend, such a single tan δ maximum is not observed, instead, broad, multiple glass transition temperatures are observed close to the transitions for component polymers. For syndiotactic high molecular weight 1,2-polybutadiene, the crystalline nature of the polymer causes phase separation on cooling of blends with cis-1,4-polyisoprene prepared in the melt. However, this phase separation does not occur if the melt blend is vulcanised, whereby the high molecular weight reactive polymer is crosslinked with the cis-1,4-polyisopene preventing separation of the phases, as demonstrated by the single glass transition observed for a vulcanised 70:30 blend (FIG. 1).

Two compositions were formulated and subjected to dynamic vulcanisation. The compositions (pre-cure) and the properties of the thermoplastic elastomer compositions obtained after dynamic vulcanisation are shown below in Table 2 for these Examples 1 (comparative) and 2.

TABLE 2

| | Example | |
|---|---|---|
| | 1 (comparative) | 2 |
| Main elastomer - NR,(SMR CV) | 73 | 66 |
| Thermoplastic resin - polypropylene | 27 | 27 |
| High M.W. reactive polymer (Buna Vi70) | — | 7 |
| M-phenylene bismaleimide (HVA-2) | 2.5 | — |
| Peroxide (DIPP) | 0.09 | 0.4 |
| Properties | | |
| Hardness, Shore A | 67 | 59 |
| M100, MPa | 4.27 | 2.08 |
| Tensile strength, MPa | 8.09 | 4.43 |
| Tensile strength: M100 | 1.89 | 2.13 |
| Elongation at break, % | 267 | 293 |
| Tension set, % | 12.6 | 10.6 |

TABLE 2-continued

| | Example | |
|---|---|---|
| | 1 (comparative) | 2 |
| Compression set: | | |
| 1 day at 23° C. | 20 | 17 |
| 1 day at 100° C. | 34 | 30 |
| Change in hardness, Shore A | | |
| 1 day at −25° C. | +6 | 0 |
| 6 days at −25° C. | +9 | +5 |

All materials contain: Calcium carbonate 35 parts; naphthenic oil 56 parts; antidegradants 1.5 parts.

Table 2 presents compositions and properties of thermoplastic vulcanisates (TPVs) prepared using a conventional peroxide/coagent cure system for dynamic vulcanisation (Example 1—comparative) with those according to the invention, i.e. without the coagent and with part of the NR replaced with the high molecular weight reactive polymer (Example 2). The TPVs were prepared by mixing in a twin screw extruder (TSE) in 2 stages. In the first stage, the main elastomer, the high molecular weight reactive polymer, thermoplastic and filler were blended and, in the second stage, this preblend was mixed with the peroxide and other ingredients.

At a given rubber/thermoplastic ratio, compositions of Example 2 have a lower hardness and modulus and better recovery properties, as demonstrated by lower compression and tension set. Tensile strength is at least commensurate with the hardness/modulus, as indicated by the tensile strength: M100 ratio given in Table 2. Extruded tapes of these TPVs according to Example 2 were superior in respect of surface finish in comparison with those of the comparable composition prepared with the conventional peroxide/coagent cure system of Example 1.

Examples 3-9

Table 3 presents compositions and properties of NRTPVs prepared without coagent (Example 3—comparative), with liquid 1,2-polybutadiene (Example 4—comparative), and with various butadiene-based polymers and copolymer (Examples 5-9). All were prepared by batch mixing the main elastomer, the high molecular weight reactive polymer or coagent, thermoplastic and filler in an internal mixer and mixing this preblend with the peroxide and other ingredients in a TSE.

TABLE 3

| | Example | | | | | | |
|---|---|---|---|---|---|---|---|
| | 3 (Comparative) | 4 (Comparative) | 5 | 6 | 7 | 8 | 9 |
| Main elastomer - NR (SMR CV) | 75 | 75 | 75 | 75 | 75 | 75 | 75 |
| Thermoplastic resin-polypropylene | 25 | 25 | 25 | 25 | 25 | 25 | 25 |
| Coagent - Liq.1,2-BR, Lithene AH | — | 3.75 | — | — | — | — | — |
| High molecular weight reactive polymer Buna Vi 70 | — | — | 3.75 | — | — | — | — |
| High molecular weight reactive polymer JSR RB 810 | — | — | — | 3.75 | — | — | — |
| High molecular weight reactive polymer High cis-BR, BR-40 | — | — | — | — | 3.75 | — | — |
| High molecular weight reactive polymer Low cis-BR, CB55 | — | — | — | — | — | 3.75 | — |
| High molecular weight reactive polymer SBR, Intol 1502 | — | — | — | — | — | — | 3.75 |
| Peroxide (DIPP) | 0.4 | 0.4 | 0.4 | 0.4 | 0.4 | 0.4 | 0.4 |
| Properties | | | | | | | |
| M100, MPa | 3.51 | 3.39 | 3.90 | 3.81 | 3.35 | 3.34 | 3.90 |
| Tensile strength, MPa | 7.20 | 6.99 | 8.92 | 7.61 | 5.82 | 8.32 | 7.27 |
| Elongation at break, % | 326 | 317 | 317 | 296 | 286 | 344 | 269 |
| Tension set, % | 16.0 | 14.6 | 12.3 | 12.6 | 13.9 | 12.0 | 14.6 |

All materials contain: Calcium carbonate 37.5 parts; naphthenic oil 20 parts; antidegradants 1.5 parts.

Tension set is lowest for Examples 5, 6 and 8 in which the high molecular reactive polymer contains a substantial 1,2-polybutadiene content.

Figure 2:
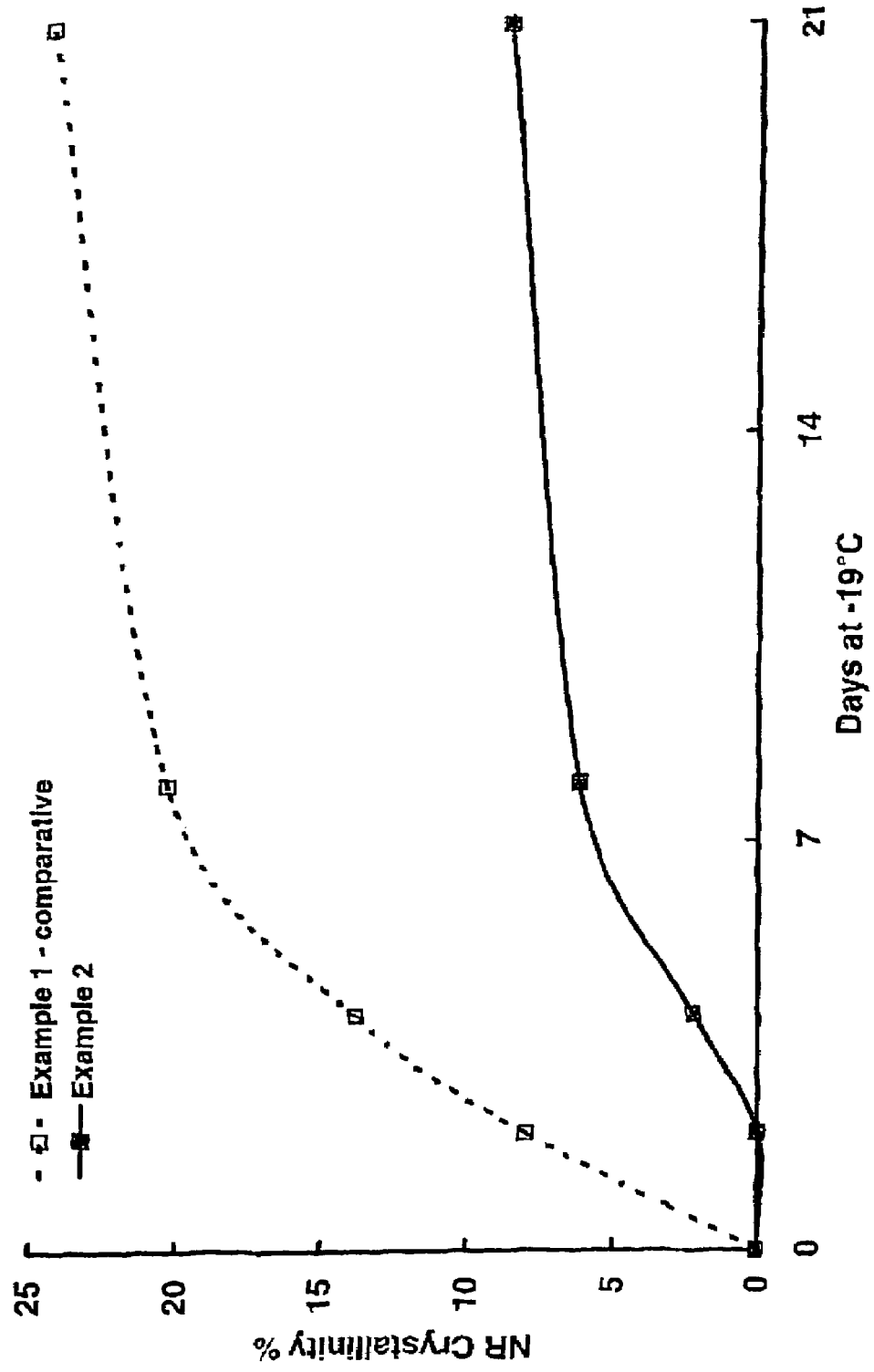
FIG. 2 is a graphical representation of the inhibition of crystallinity in natural rubber based thermoplastic vulcanisate (TPV) by high vinyl polybutadiene.

One consequence of the miscible nature of blends such as Buna Vi 70 and NR is a reduction in the propensity of NR to crystallize at low temperatures, as demonstrated by the induction period with no increase in hardness and the lower increase in hardness recorded at −25° C. after 6 days at this temperature (Table 2). This behaviour is confirmed by Differential Scanning Calorimetry (DSC) which is a commonly used procedure used for measuring thermal transitions such as crystallization. FIG. 2 indicates the degree of crystallinity of the NR component of Examples 1 (comparative) and 2 after storage in a freezer at −19° C. It is seen that Example 2 exhibits an induction period of at least 48 hr before any NR crystallinity is detected, compared with Example 1. The degree of crystallinity reached upon prolonged storage at −19° C. is also significantly lower over the same time interval for Example 2 compared with Example 1.

Polybutadiene rubber with a high cis-1,4 content, which is immiscible with NR, is shown to be effective in enhancing crosslinking during dynamic vulcanisation of blends in which NR is the main component by the low tension set recorded (Example 7 in Table 3) relative to that seen for the control material (Example 3—comparative). The tension set is also lower than seen for where liquid 1,2-polybutadiene is used (Example 4—comparative).

SBR, which is immiscible with NR, is shown to be effective in enhancing crosslinking during dynamic vulcanisation of blends in which NR is the main component by the low tension set recorded (Example 9) in Table 3 relative to that seen for the control material (Example 3—comparative). The tension set is the same as seen for where liquid 1,2-polybutadiene is used (Example 4—comparative).

Examples 10-13

The miscibility of ENR and NBR is not so widely known. As an example, it is shown here that ENR with an epoxide content of 50 mole % (ENR-50) is miscible with NBR having a nominal acrylonitrile content of 18% (NBR-18). This is demonstrated by the observation of a single glass transition for a 70:30 ENR-50:NBR-18 blend at −19° C. rather than two glass transitions at temperatures close to those of ENR-50 and NBR-18 (−10.5° C. and −36° C. respectively), as shown in FIG. 3. NBR having a nominal acrylonitrile content of 21 mole % is not miscible with ENR-50; it is to be expected that for any given epoxide content of the ENR, there will be a particular narrow range of acrylonitrile content in NBR at which the NBR will be miscible with the ENR.

The data in FIG. 3 also demonstrates a reduction in glass transition temperature corresponding to some 4° C. per 10% added NBR-18 in the blend. Thus, an ENR-50 based thermoplastic vulcanizate cured using peroxide/NBR-18 is expected to show improved low temperature properties due to a reduction in glass transition temperature of the ENR-50.

That NBR-18 enhances crosslinking of ENR-50 is demonstrated in Table 4 by the high cure rheometer torque and high peak cure rate for a 95:5 ENR-50:NBR-18 blend (Example 11) relative to the control ENR-50 compound (Example 10—comparative) cured with 1.2 phr DHBP.

The improved recovery properties of a peroxide cured thermoplastic vulcanizate based on ENR-50 with NBR-18 (Example 13) are demonstrated in Table 5 where tension set is reduced in comparison with an ENR-50 based thermoplastic vulcanizate cured using a liquid 1,2-polybutadiene coagent (Example 12—comparative).

TABLE 4

| | Example | |
|---|---|---|
| | 10 (Comparative) | 11 |
| Main elastomer - ENR-50 | 100 | 95 |
| High molecular weight reactive polymer (Perbunan 1807) | 0 | 5 |
| Peroxide (DHBP) | 1.2 | 1.2 |
| Rheometer properties (180° C.) | | |
| Torque rise, dNm | 4.61 | 5.47 |
| Peak cure rate, dNm/min | 1.40 | 1.71 |

TABLE 5

| | Example | |
|---|---|---|
| | 12 (Comparative) | 13 |
| Main elastomer - ENR-50 | 75 | 75 |
| Thermoplastic resin-Polypropylene* | 25 | 25 |
| Coagent - liq. 1,2-BR Lithene AH | 3.75 | — |
| High molecular weight reactive polymer Perbunan 1807 | — | 3.75 |
| Peroxide (DIPP) | 0.4 | 0.4 |
| Properties | | |
| M100, MPa | 4.16 | 2.98 |
| Tensile strength, MPa | 7.67 | 6.46 |
| Elongation at break, % | 355 | 358 |
| Tension set, % | 20.0 | 16.0 |

All materials contain: Calcium carbonate 37.5 parts; ester plasticizer 20 parts; antidegradants 1.0 parts;
*Thermoplastic resin contains carboxylated polypropylene compatibilizer.

Examples 14-17

High molecular weight 1,2-polybutadiene (RB 810), which is immiscible with ethylene-propylene-diene rubber, is shown to be effective in enhancing crosslinking during dynamic vulcanization of a blend in which ethylene-propylene-diene rubber is the main elastomer component by the low tension set recorded (Example 15 in Table 6) relative to that seen for the control material (Example 14—comparative).

A further example where high molecular weight 1,2-polybutadiene (RB 810), which is immiscible with ethylene-propylene-diene rubber is shown to be effective in enhancing crosslinking during dynamic vulcanisation of a blend in which ethylene-propylene-diene rubber is the main elastomer component, is by the low tension set and low compression set recorded (Example 17 in Table 7) relative to that seen for the control material (Example 16—comparative). Here, Examples 16—comparative and Example 17 have been mixed using a twin screw extruder in a single stage process.

TABLE 6

| | Example | |
|---|---|---|
| | 14 (Comparative) | 15 |
| Main elastomer - EPDM (Polysar 5875) | 75 | 75 |
| Thermoplastic resin-Polypropylene | 25 | 25 |
| High molecular weight reactive polymer JSR RB 810 | — | 3.75 |
| Peroxide (DIPP) | 0.4 | 0.4 |
| Properties | | |
| M100, MPa | 4.33 | 4.56 |
| Tensile strength, MPa | 8.16 | 8.33 |
| Elongation at break, % | 558 | 466 |
| Tension set, % | 23.4 | 19.7 |

All materials contain: Calcium carbonate 37.5 parts; antidegradants 1.5 parts.

TABLE 7

| | Example | |
|---|---|---|
| | 16 (Comparative) | 17 |
| Main elastomer - EPDM (Buna EP T 4969) | 150 | 130 |
| Thermoplastic resin - polypropylene | 25 | 25 |
| High molecular weight reactive polymer JSR RB 810 | — | 10 |
| Peroxide (DYBP) | 1.25 | 1.25 |
| Paraffinic oil | 10 | 20 |
| Properties | | |
| Hardness (Shore A) | 63 | 68 |
| M100 | 1.6 | 2.4 |
| Tensile strength, MPa | 3.9 | 4.6 |
| Elongation at break, % | 800 | 440 |
| Tension set, % | 13.3 | 12.0 |
| Compression set: | | |
| 1 day at 23° | 34 | 28 |
| 1 day at 70° C. | 56 | 43 |

All compounds contain: Calcium carbonate 37.5 parts; antidegradants 1.0 parts.

REFERENCES (1) Chapter 7 by A. Y. Coran in "*Thermoplastic Elastomers, a Comprehensive Review*", N. R. Legge, G. Holden and H. E. Schroeder, eds., Hanser, Munich, 1987.
(2) TREFSIN®—Advanced Elastomer Systems
(3) Such as SANTOPRENE®—Advanced Elastomer Systems
(4) Such as VYRAM®—Advanced Elastomer Systems
(5) GEOLAST®—Advanced Elastomer Systems
(6) E²® EK Polymers
(7) SANTOPRENE® 8000 Series, Advanced Elastomer Systems
(8) L. D. Loan, Rubber Chem. Technology, 40 149-176, 1967.
(9) F. W. Billmeyer, Jr., "*Textbook of Polymer Science*" 3$^{rd}$ Ed., Wiley-Interscience, New York, 1984, pp 3-16.
(10) J. W. Martin, Rubber Chem. Technology, 62 275-285, 1973.
(11) S. Kawahara and S. Akiyama, Polymer Journal, 23 7-14, 1991.
(12) S. Cook, J. Rubb. Res., 4 69-81 2001.
(13) C. M. Roland, Rubber Chem. Technology, 62 456-497, 1989.

The invention claimed is:

1. A thermoplastic elastomer composition comprising a blend of a thermoplastic component with a cured elastomer component wherein the elastomer component prior to curing comprises a single elastomer phase containing from 98 to 80 parts by weight per one hundred parts of total elastomer of a main elastomer and from 2 to 20 parts by weight per one hundred parts of total elastomer of a high molecular weight reactive polymer, having a weight average molecular weight of at least 100,000 which shows a higher crosslinking efficiency in free-radical induced vulcanisation than the main elastomer, the high molecular weight reactive polymer being miscible with the main elastomer to provide a single elastomer phase.

2. A composition according to claim 1, wherein the thermoplastic component comprises a polyolefin resin.

3. A composition according to claim 2, wherein the polyolefin resin is polyethylene or polypropylene.

4. A composition according to claim 3, wherein the polyolefin resin is polypropylene resin.

5. A composition according to claim 1, wherein the main elastomer is cis-1,4-polyisoprene and the high molecular weight reactive polymer miscible with the main elastomer is polybutadiene having a 1,2-polybutadiene content of at least 30%.

6. A composition according to claim 1, wherein the main elastomer is cis-1,4-polyisoprene and the high molecular weight reactive polymer miscible with the main elastomer is polybutadiene having a 1,2-polybutadiene contend of at least 30%.

7. A composition according to claim 5, wherein the high molecular weight reactive polymer is 1,2-polybutadiene.

8. A composition according to claim 5, wherein the main elastomer is natural rubber.

9. A composition according to claim 1, wherein the main elastomer is epoxidized cis-1,4-polyisoprene and the high molecular weight reactive polymer miscible with the main elastomer is acrylonitrile-butadiene rubber having an acrylonitrile content to confer miscibility with the main elastomer.

10. A composition according to claim 9, wherein the epoxidized cis-1,4-polyisoprene is epoxidized natural rubber.

11. A composition according to claim 9, wherein, the epoxidized cis-1,4-polyisoprene has an epoxide content of from 48 to 52 mole % and the acrylonitrile-butadiene rubber has an acrylonitrile content of from 17 to 19%.

12. A composition according to claim 9, wherein the epoxidized cis-1,4-polyisoprene has an epoxide content of from 58 to 62 mole % and the acrylonitrile-butadiene rubber has an acrylonitrile content of from 20 to 23%.

13. A composition according to claim 10, wherein the epoxidized cis-1,4-polyisoprene has an epoxide content of from 48 to 52 mole % and the acrylonitrile-butadiene rubber has an acrylonitrile content of from 17 to 19%.

14. A composition according to claim 10, wherein the epoxidized cis-1,4-polyisoprene has an epoxide content of from 58 to 62 mole % and the acrylonitrile-butadiene rubber has an acrylonitrile content of from 20 to 23%.

15. A composition according to claim 1, comprising from 15 to 75 parts by weight of the thermoplastic component and from 85 to 25 parts by weight of the cured elastomer component per one hundred parts by weight of the total of the thermoplastic component and the cured elastomer component.

16. A composition according to claim 1, wherein the elastomer component prior to curing comprises, per one hundred parts of total elastomer, from 3 to 15 parts by weight of the high molecular weight reactive polymer.

17. A composition according to claim 16, wherein the elastomer component prior to curing comprises, per one hundred parts of total elastomer, from 4 to 10 parts by weight of the high molecular weight reactive polymer.

18. A composition according to claim 1, wherein the cured elastomer component is partially crosslinked.

19. A composition according to claim 1, wherein the cured elastomer component is fully crosslinked.

20. A method of making the thermoplastic elastomer composition of claim 1, comprising the steps of mixing a thermoplastic component with an elastomer component containing from 98 to 80 parts by weight per one hundred parts of total elastomer of a main elastomer and from 2 to 20 parts by weight per one hundred parts of total elastomer of a high molecular weight reactive polymer, having a weight average molecular weight of at least 100,000, which shows a higher crosslinking efficiency in free-radical induced vulcanisation than the main elastomer, said high molecular weight reactive polymer being miscible with the main elastomer, wherein the mixing of the thermoplastic component and the elastomer component is carried out at a temperature to cause melting of the thermoplastic component to give a melt blend of the components and subjecting the elastomer component in the melt blend to cure in the presence of at least one curative free-radical source.

21. A method according to claim 20, wherein the curative free-radical source is a peroxide.

22. A method according to claim 20, wherein the curative is mixed with the thermoplastic component and the elastomer component such that it is incorporated into the melt blend.

23. A method according to claim 20, wherein the curative is added to the melt blend prior to the curing stage.

24. A feedstock composition for use in a dynamic vulcanisation process comprising a mixture of a thermoplastic component and an elastomer component which comprises from 98 to 80 parts by weight per one hundred pans of total elastomer of a main elastomer and from 2 to 20 parts by weight per one hundred parts of total elastomer of a high molecular weight reactive polymer, having a weight average molecular weight of at least 100,000, which shows a higher crosslinking efficiency in free-radical induced vulcanisation than the main elastomer, said high molecular weight reactive polymer being miscible with the main elastomer.

25. A feedstock composition according to claim 24, wherein the thermoplastic component comprises a polyolefin resin.

26. A feedstock composition according to claim 25, wherein the polyolefin resin is polyethylene or polypropylene resin.

27. A feedstock composition according to claim 26, wherein the polyolefin resin is polypropylene resin.

28. A feedstock composition according to claim 24, wherein the main elastomer is cis-1,4-polyisoprene and the high molecular weight reactive polymer miscible with the main elastomer is polybutadiene having a 1,2-polybutadiene content of at least 30%.

29. A feedstock composition according to claim 28, wherein the high molecular weight reactive polymer is 1,2-polybutadiene.

30. A feedstock composition according to claim 28, wherein the main elastomer is natural rubber.

31. A feedstock composition according to claim 24, wherein the main elastomer is epoxidized cis-1,4-polyisoprene and the high molecular weight reactive polymer miscible with the main elastomer is acrylonitrile-butadiene rubber having an acrylonitrile content to confer miscibility with the main elastomer.

32. A feedstock composition according to claim 31, wherein the epoxidized cis-1,4-polyisoprene is epoxidized natural rubber.

33. A feedstock composition according to claim 31, wherein the epoxidized cis-1,4-polyisoprene has an epoxide content of from 48 to 52 mole % and the acrylonitrile-butadiene rubber has an acrylonitrile content of from 17 to 19%.

34. A feedstock composition according to claim 31, wherein the epoxidized cis-1,4-polyisoprene has an epoxide content of from 58 to 62 mole % and the acrylonitrile-butadiene rubber has an acrylonitrile content of from 20 to 23%.

35. A feedstock composition according to claim 24, comprising from 15 to 75 parts by weight of the thermoplastic component and 85 to 25 parts by weight of the elastomer component per one hundred parts by weight of the total of the thermoplastic component and the elastomer component.

36. A feedstock composition according to claim 24, wherein the elastomer component comprises, per one hundred parts of total elastomer, from 3 to 15 parts by weight of the high molecular weight reactive polymer.

37. A feedstock composition according to claim 36, wherein the elastomer component comprises, per one hundred parts of total elastomer, from 4 to 10 parts by weight of the high molecular weight reactive polymer.

38. A feedstock composition according to claim 24, which additionally comprises at least one curative free-radical source.

39. A feedstock composition according to claim 38, wherein the curative free-radical source is a peroxide.

40. A feedstock composition according to claim 24, which additionally comprises one or more additives selected from pigments, dyes, fillers, stabilizers, antioxidants, plasticizers and process aids.

* * * * *